(12) United States Patent
Zhang et al.

(10) Patent No.: US 12,015,985 B2
(45) Date of Patent: Jun. 18, 2024

(54) UPLINK TRANSMIT POWER CONTROL

(71) Applicant: NOKIA SOLUTIONS AND NETWORKS OY, Espoo (FI)

(72) Inventors: Yi Zhang, Beijing (CN); Yuantao Zhang, Beijing (CN); De Shan Miao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 380 days.

(21) Appl. No.: 16/078,964

(22) PCT Filed: Feb. 24, 2016

(86) PCT No.: PCT/CN2016/074443
§ 371 (c)(1),
(2) Date: Aug. 23, 2018

(87) PCT Pub. No.: WO2017/143536
PCT Pub. Date: Aug. 31, 2017

(65) Prior Publication Data
US 2020/0178180 A1    Jun. 4, 2020

(51) Int. Cl.
*H04W 52/14* (2009.01)
*H04W 52/08* (2009.01)
*H04W 52/42* (2009.01)

(52) U.S. Cl.
CPC ......... *H04W 52/146* (2013.01); *H04W 52/08* (2013.01); *H04W 52/42* (2013.01)

(58) Field of Classification Search
CPC ........... H04W 52/00–60; H04W 52/08; H04W 52/42; H04W 52/146
See application file for complete search history.

(56) References Cited

U.S. PATENT DOCUMENTS

| | | | |
|---|---|---|---|
| 9,456,421 B2* | 9/2016 | Pan | H04W 52/281 |
| 2007/0218950 A1 | 9/2007 | Codreanu et al. | |
| 2009/0318183 A1* | 12/2009 | Hugl | H04W 52/42 |
| | | | 455/522 |
| 2011/0003598 A1* | 1/2011 | Ma | H04W 52/386 |
| | | | 455/452.1 |

(Continued)

FOREIGN PATENT DOCUMENTS

| | | |
|---|---|---|
| CN | 101316126 A | 12/2008 |
| CN | 102474834 A | 5/2012 |

(Continued)

OTHER PUBLICATIONS

Office Action for Korean Application No. 10-2018-7027594, dated Jan. 31, 2020, 15 pages.

(Continued)

*Primary Examiner* — Raymond S Dean
(74) *Attorney, Agent, or Firm* — Brake Hughes Bellermann LLP

(57) ABSTRACT

There is a method comprising determining a beamforming configuration for a time period for reception of uplink data from a user device, determining uplink power control information based on the determined beamforming configuration and providing an indication of the determined uplink power control information to the user device for use in determining uplink transmit power for the time period.

18 Claims, 9 Drawing Sheets

(56) References Cited

U.S. PATENT DOCUMENTS

| | | | |
|---|---|---|---|
| 2011/0195735 A1* | 8/2011 | Irmer | H04W 52/346 |
| | | | 455/509 |
| 2011/0306381 A1 | 12/2011 | Jia et al. | |
| 2012/0195224 A1 | 8/2012 | Kazmi et al. | |
| 2013/0039286 A1* | 2/2013 | Larsson | H04W 52/146 |
| | | | 370/329 |
| 2013/0114562 A1 | 5/2013 | Seo et al. | |
| 2013/0114577 A1* | 5/2013 | Cai | H04L 5/0053 |
| | | | 370/336 |
| 2013/0322374 A1 | 12/2013 | Cai et al. | |
| 2014/0177602 A1 | 6/2014 | Chen et al. | |
| 2014/0185481 A1* | 7/2014 | Seol | H04W 52/24 |
| | | | 370/252 |
| 2014/0315594 A1 | 10/2014 | Jeong et al. | |
| 2014/0376466 A1 | 12/2014 | Jeong et al. | |
| 2015/0110023 A1 | 4/2015 | Pan et al. | |
| 2015/0163755 A1 | 6/2015 | Tripathi et al. | |
| 2015/0208361 A1 | 7/2015 | Kim et al. | |
| 2015/0327180 A1* | 11/2015 | Ryu | H04W 72/0473 |
| | | | 370/329 |
| 2017/0311342 A1* | 10/2017 | You | H04B 7/0695 |
| 2018/0192375 A1* | 7/2018 | Xia | H04W 52/32 |
| 2018/0310298 A1* | 10/2018 | Li | H04L 1/1812 |
| 2019/0104477 A1* | 4/2019 | MolavianJazi | H04B 7/088 |
| 2019/0387478 A1* | 12/2019 | Sundin | H04B 7/0617 |
| 2020/0068494 A1* | 2/2020 | Wen | H04W 72/046 |
| 2020/0100188 A1* | 3/2020 | Yasukawa | H04W 52/247 |

FOREIGN PATENT DOCUMENTS

| | | |
|---|---|---|
| CN | 102577542 A | 7/2012 |
| CN | 103314608 A | 9/2013 |
| CN | 104205955 A | 12/2014 |
| CN | 104704889 A | 6/2015 |
| KR | 20140126686 A | 10/2014 |
| KR | 20150000304 A | 1/2015 |

OTHER PUBLICATIONS

European Search Report for Application No. 16890990.1, dated Sep. 16, 2019, 8 pages.

Sesia et al.; LTE—The UMTS Long Term Evolution: From Theory to Practice; Second Edition; John Wiley & Sons Ltd., 2011; Overview of LTE MIMO is available in Chapters 11 and 29 (book link), http://www.aldraji.com/download/The_UMTS_Long_Term_EvolutionB.pdf;.

Nsenga et.al.; "Joint Transmit and Receive Analog Beamforming in 60GHz MIMO Multipath Channels"; EEE International Conference on Communications; Dresden, Jun. 2009; pp. 1-5.

Alkhateeb et.al., "Channel Estimation and Hybrid Precoding for Millimeter Wave Cellular System"; IEEE Journal of Selected Topics in Signal Processing; vol. 8, No. 5; Oct. 2014; pp. 831-846.

3GPP TS 36.213 V12.6.0; 3rd Generation Partnership Project; Technical Specification Group Radio Access Network; Evolved Universal Terrestrial Radio Access (E-UTRA); Physical layer procedures (Release 12); Sophia Antipolis, France, Jun. 2015; 241 pages.

Office Action for European Patent Application No. 16890990.1, dated Jun. 23, 2020, 4 pages.

International Search Report and Written Opinion for International Application No. PCT/CN2016/074443, dated Nov. 30, 2016, 12 pages.

Office Action for Indian Application No. 201817024981, dated Jul. 23, 2020, 6 pages.

Office Action for Chinese Serial No. 2020102802545640, dated Nov. 2, 2020; 10 pages.

Office Action for European Application No. 16890990.1, dated Apr. 22, 2022, 7 pages.

Office Action for Chinese Application No. 202110801185.6, mailed on Sep. 23, 2023, 14 pages.

3GPP TSG-RAN WG1 Meeting #59; R1-094974; "Beam Forming Simulation Results", Source: Nokia Siemens Networks, Nokia; Agenda Item: 5.6.3 UTRA UL TxDiv, Link Level Results; Jeju, Korea; Nov. 9-13, 2009, 6 pages.

Office Action for European Patent Application No. 16890990.1, mailed on Dec. 4, 2023, 7 pages.

Office Action for Chinese Patent Application No. 202110801185.6, mailed on Mar. 1, 2024, 7 pages.

\* cited by examiner

UPLINK TRANSMIT POWER CONTROL

FIELD

The present application relates to a method, apparatus, system and computer program and in particular but not exclusively to an enhanced power control scheme for massive multiple-input multiple-output systems.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. LTE is being standardized by the 3rd Generation Partnership Project (3GPP).

SUMMARY

In a first aspect there is provided a method comprising determining a beamforming configuration for a time period for reception of uplink data from a user device, determining uplink power control information based on the determined beamforming configuration and providing an indication of the determined uplink power control information to the user device for use in determining uplink transmit power for the time period.

The method may comprise determining the uplink power control information based on a beamforming gain associated with the determined beamforming configuration.

The method may comprise determining the uplink power control information based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters, such that the user device is able to determine the set of power control parameters to be applied for a time period based on a time period index associated with that time period.

The method may comprise providing an indication of closed loop uplink transmit power control information to further adjust the uplink transmit power value determined based on the uplink power control information.

The closed loop uplink transmit power control information may be based on a common accumulated power control mode for a plurality of user devices. The method may comprise determining the closed loop uplink transmit power control information based on a reference beamforming gain associated with a reference beamforming configuration.

Beamforming configuration may define the orientation of at least one of at least one receive beam and at least one transmit beam.

The time period may be a subframe.

In a second aspect there is provided a method comprising receiving an indication of determined uplink power control information from a network node, wherein said uplink power control information is determined based on a determined beamforming configuration for a time period intended for transmission of uplink data from a user device and using said indication to determine uplink transmit power for the time period.

The method may comprise performing a downlink signal strength measurement with respect to a reference beamforming configuration.

The method may comprise performing a downlink signal strength measurement with respect to each of a plurality of beamforming configurations, each beamforming configuration associated with a respective one of a plurality of sets of power control parameters.

The uplink power control information may be determined based on a beamforming gain associated with the determined beamforming configuration.

The uplink power control information may be determined based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters. The method may comprise determining the set of power control parameters to be applied for a time period based on a time period index associated with that time period.

The method may comprise receiving an indication of closed loop uplink transmit power control information to further adjust the uplink transmit power value determined based on the uplink power control information.

The closed loop uplink transmit power control information may be based on a common accumulated power control mode for a plurality of user devices. The closed loop uplink transmit power control information may be determined based on a reference beamforming gain associated with a reference beamforming configuration.

Beamforming configuration may define the orientation of at least one of at least one receive beam and at least one transmit beam.

The time period may be a subframe.

In a third aspect there is provided an apparatus, said apparatus comprising means for determining a beamforming configuration for a time period for reception of uplink data from a user device, means for determining uplink power control information based on the determined beamforming configuration and means for providing an indication of the determined uplink power control information to the user device for use in determining uplink transmit power for the time period.

The apparatus may comprise means for determining the uplink power control information based on a beamforming gain associated with the determined beamforming configuration.

The apparatus may comprise means for determining the uplink power control information based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters, such that the user device is able to determine the set of power control parameters to be applied for a time period based on a time period index associated with that time period.

The apparatus may comprise means for providing an indication of closed loop uplink transmit power control information to further adjust the uplink transmit power value determined based on the uplink power control information.

The closed loop uplink transmit power control information may be based on a common accumulated power control mode for a plurality of user devices. The apparatus may comprise means for determining the closed loop uplink transmit power control information based on a reference beamforming gain associated with a reference beamforming configuration.

Beamforming configuration may define the orientation of at least one of at least one receive beam and at least one transmit beam.

The time period may be a subframe.

In a fourth aspect there is provided an apparatus, said apparatus comprising means for receiving an indication of determined uplink power control information from a network node, wherein said uplink power control information is determined based on a determined beamforming configuration for a time period intended for transmission of uplink data from a user device and means for using said indication to determine uplink transmit power for the time period.

The apparatus may comprise means for performing a downlink signal strength measurement with respect to a reference beamforming configuration.

The apparatus may comprise means for performing a downlink signal strength measurement with respect to each of a plurality of beamforming configurations, each beamforming configuration associated with a respective one of a plurality of sets of power control parameters.

The uplink power control information may be determined based on a beamforming gain associated with the determined beamforming configuration.

The uplink power control information may be determined based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters. The apparatus may comprise means for determining the set of power control parameters to be applied for a time period based on a time period index associated with that time period.

The apparatus may comprise means for receiving an indication of closed loop uplink transmit power control information to further adjust the uplink transmit power value determined based on the uplink power control information.

The closed loop uplink transmit power control information may be based on a common accumulated power control mode for a plurality of user devices. The closed loop uplink transmit power control information may be determined based on a reference beamforming gain associated with a reference beamforming configuration.

Beamforming configuration may define the orientation of at least one of at least one receive beam and at least one transmit beam.

The time period may be a subframe.

In a fifth aspect there is provided an apparatus, said apparatus comprising at least one processor and at least one memory including a computer program code, the at least one memory and the computer program code configured to, with the at least one processor, cause the apparatus at least to determine a beamforming configuration for a for a time period for reception of uplink data from a user device, determine uplink power control information based on the determined beamforming configuration and provide an indication of the determined uplink power control information to the user device for use in determining uplink transmit power for the time period.

The apparatus may comprise be configured to determine the uplink power control information based on a beamforming gain associated with the determined beamforming configuration.

The apparatus may be configured to determine the uplink power control information based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters, such that the user device is able to determine the set of power control parameters to be applied for a time period based on a time period index associated with that time period.

The apparatus may be configured to provide an indication of closed loop uplink transmit power control information to further adjust the uplink transmit power value determined based on the uplink power control information.

The closed loop uplink transmit power control information may be based on a common accumulated power control mode for a plurality of user devices. The apparatus may be configured to determine the closed loop uplink transmit power control information based on a reference beamforming gain associated with a reference beamforming configuration.

Beamforming configuration may define the orientation of at least one of at least one receive beam and at least one transmit beam.

The time period may be a subframe.

In a sixth aspect an apparatus, said apparatus comprising at least one processor and at least one memory including a computer program code, the at least one memory and the computer program code configured to, with the at least one processor, cause the apparatus at least to receive an indication of determined uplink power control information from a network node, wherein said uplink power control information is determined based on a determined beamforming configuration for a time period intended for transmission of uplink data from a user device and use said indication to determine uplink transmit power for the time period.

The apparatus may be configured to perform a downlink signal strength measurement with respect to a reference beamforming configuration.

The apparatus may be configured to perform a downlink signal strength measurement with respect to each of a plurality of beamforming configurations, each beamforming configuration associated with a respective one of a plurality of sets of power control parameters.

The uplink power control information may be determined based on a beamforming gain associated with the determined beamforming configuration.

The uplink power control information may be determined based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters. The apparatus may be configured to determine the set of power control parameters to be applied for a time period based on a time period index associated with that time period.

The apparatus may be configured to receive an indication of closed loop uplink transmit power control information to further adjust the uplink transmit power value determined based on the uplink power control information.

The closed loop uplink transmit power control information may be based on a common accumulated power control mode for a plurality of user devices. The closed loop uplink transmit power control information may be determined based on a reference beamforming gain associated with a reference beamforming configuration.

Beamforming configuration may define the orientation of at least one of at least one receive beam and at least one transmit beam.

The time period may be a subframe.

In a seventh aspect there is provided a computer program embodied on a non-transitory computer-readable storage medium, the computer program comprising program code for controlling a process to execute a process, the process comprising determining a beamforming configuration for a time period for reception of uplink data from a user device, determining uplink power control information based on the determined beamforming configuration and providing an indication of the determined uplink power control information to the user device for use in determining uplink transmit power for the time period.

The process may comprise determining the uplink power control information based on a beamforming gain associated with the determined beamforming configuration.

The process may comprise determining the uplink power control information based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters, such that the user device is able to determine the set of power control parameters to be applied for a time period based on a time period index associated with that time period.

The process may comprise providing an indication of closed loop uplink transmit power control information to further adjust the uplink transmit power value determined based on the uplink power control information.

The closed loop uplink transmit power control information may be based on a common accumulated power control mode for a plurality of user devices. The process may comprise determining the closed loop uplink transmit power control information based on a reference beamforming gain associated with a reference beamforming configuration.

Beamforming configuration may define the orientation of at least one of at least one receive beam and at least one transmit beam.

The time period may be a subframe.

In an eighth aspect there is provided a computer program embodied on a non-transitory computer-readable storage medium, the computer program comprising program code for controlling a process to execute a process, the process comprising receiving an indication of determined uplink power control information from a network node, wherein said uplink power control information is determined based on a determined beamforming configuration for a time period intended for transmission of uplink data from a user device and using said indication to determine uplink transmit power for the time period.

The process may comprise performing a downlink signal strength measurement with respect to a reference beamforming configuration.

The process may comprise performing a downlink signal strength measurement with respect to each of a plurality of beamforming configurations, each beamforming configuration associated with a respective one of a plurality of sets of power control parameters.

The uplink power control information may be determined based on a beamforming gain associated with the determined beamforming configuration.

The uplink power control information may be determined based on a comparison between the beamforming gain associated with the determined beamforming configuration and a reference beamforming gain associated with a reference beamforming configuration.

The power uplink control information may comprise an indication of an uplink transmit power value to be applied during the time period.

The uplink transmit power value may comprise an offset relative to a reference uplink transmit power value.

The uplink power control information may comprise an indication of a set of power control parameters from a plurality of sets of power control parameters to be used by the user device in controlling uplink transmit power.

The power control information may comprise an indication of a set of time periods associated with a respective one of the plurality of sets of power control parameters. The process may comprise determining the set of power control parameters to be applied for a time period based on a time period index associated with that time period.

The process may comprise receiving an indication of closed loop uplink transmit power control information to further adjust the uplink transmit power value determined based on the uplink power control information.

The closed loop uplink transmit power control information may be based on a common accumulated power control mode for a plurality of user devices. The closed loop uplink transmit power control information may be determined based on a reference beamforming gain associated with a reference beamforming configuration.

Beamforming configuration may define the orientation of at least one of at least one receive beam and at least one transmit beam.

The time period may be a subframe.

In a ninth aspect there is provided a computer program product for a computer, comprising software code portions for performing the steps the method of the first and second aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DESCRIPTION OF EMBODIMENTS

Before explaining in detail the examples, certain general principles of a wireless communication system and mobile communication devices are briefly explained with reference to FIGS. 1 to 2 to assist in understanding the technology underlying the described examples.

Figure 1:
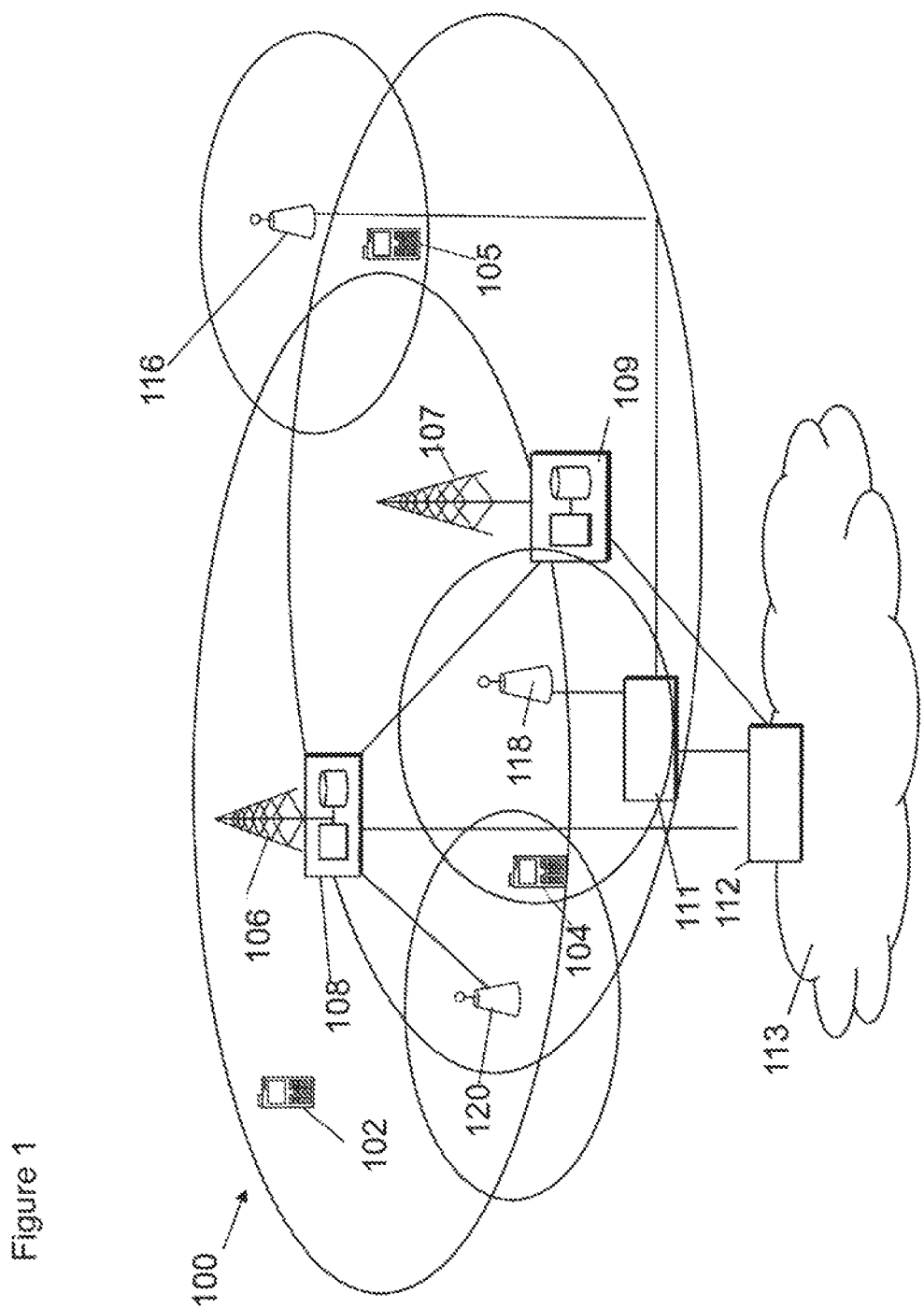
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. A base station is referred to as an eNodeB B (eNB) in LTE. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e) NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
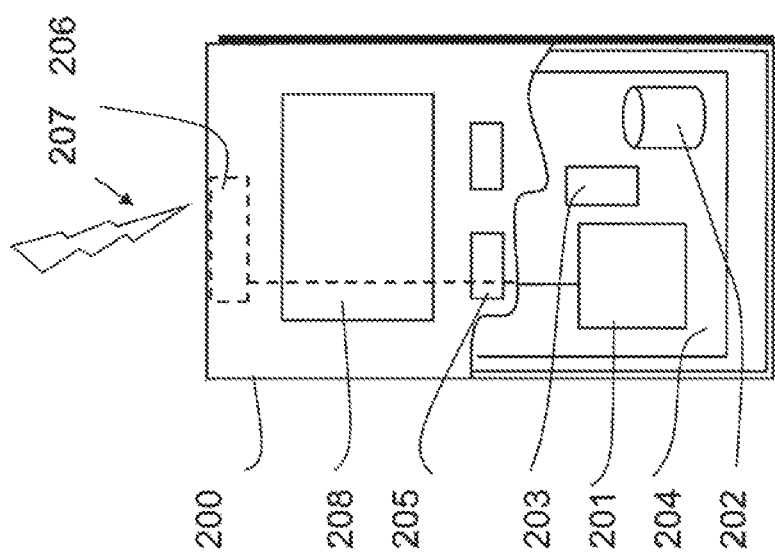
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

In an LTE system, power control is used for PUSCH, PUCCH and SRS. Power control may be defined as composed of an open loop power control part and a close loop power control part. For the open loop control part, the desired link quality may be guaranteed by setting a baseline (or reference) transmit power on account of pathloss. For the close loop power control part, finer power adjustment is used for one specific transmission on account of channel and interference condition.

When PUCCH and PUSCH are not transmitted in the same subframe, the transmit power for PUSCH is given by:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \quad (1)$$

where, $P_{CMAX,c}(i)$ is the configured maximal allowed transmit power for a specific cell c; $M_{PUSCH,c}(i)$ is the allocated uplink PRB number; $P_{O\_PUSCH,c}(i)$ is composed of a cell specific parameter $P_{O\_NOMINAL\_PUSCH,c}(j)$ and a UE specific parameter $P_{O\_PUSCH,c}(j)$; $PL_c$ is downlink pathloss estimated in the UE for serving cell c in dB and $PL_c$=reference SignalPower–higher layer filtered RSRP, where referenceSignalPower is provided by higher layer signalling; con is a cell specific pathloss compensation factor to achieve balance between cell average and cell edge throughput; $P_{O\_PUSCH,c}(j)+\alpha_c(j)\cdot PL_c$ provides baseline transmit power for open loop power control part; $\Delta_{TF,c}(i)$ is a compensation item related with PUSCH transmit format, e.g. MCS; $f_c(i)$ is power adjustment derived from transmit power control (TPC) field of dynamic signalling, i.e., DCI 0/3/3A/4 for PUSCH. For PUSCH, $f_c(i)$ is determined by:

$$f_c(i)=f_c(i-1)+\delta_{PUSCH,c}(i-K_{PUSCH}) \text{ for accumulated adjustment mode} \quad (2)$$

$$f_c(i)=\delta_{PUSCH,c}(i-K_{PUSCH}) \text{ for absolute adjustment mode} \quad (3)$$

where $K_{PUSCH}$ equals 4 for FDD frame structure; $\delta_{PUSCH,c}$ (i–$K_{PUSCH}$) is indicated by TPC signalling.

Future wireless systems may have support for Massive MIMO (m-MIMO). In such multiple input-multiple output (MIMO) communication, there may be many antenna elements for transmission or reception of data. The embodiments discussed herein are equally applicable to full MIMO scenarios, as well as to scenarios where only the eNB (or a corresponding network node) has many antennas to perform receive beamforming and the UE has one antenna, and to scenarios where the UE has many antennas to perform transmit beamforming and the eNB has only one antenna. Massive MIMO systems are characterized by a larger antenna number, finer beamforming and higher antenna gain. The maximum beamforming gain in theory is $10 \times \log_{10}$ (N)db, where N is number of antenna used for beamforming. For example, there is up-to 9 dB gap for beamforming gain between 8 antenna elements and 1 antenna element.

For m-MIMO system, active antenna systems having more controllable antennas allowing flexible beamforming schemes may be introduced. Thus, the dynamic range of beamforming gain will become larger. The beamforming gain can change rapidly in case of beam switching.

Figure 3:
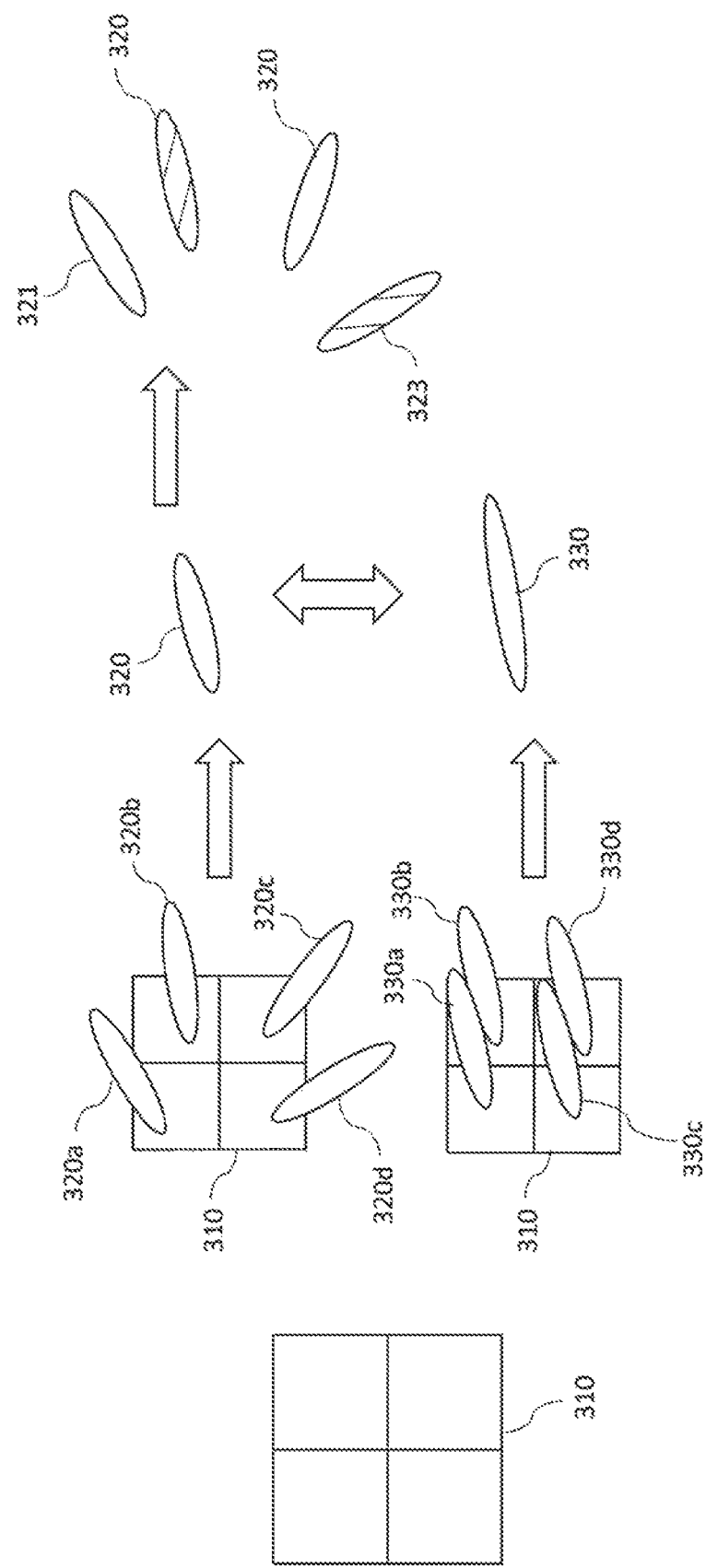
FIG. 3 shows a schematic illustration of different beamforming gains

FIG. 3 provides an illustration of different beamforming gain. FIG. 3 illustrates antenna architecture sub array structure 310. When the subarray architecture 310 is used for hybrid beamforming, the possible beam can have various shapes, e.g. direction and width. FIG. 3 shows a potential receive beam 320 based on multiple beams 320a, 320b, 320c, 320d for multiple users, and an optimised receive beam 330 based on multiple beams 330a, 330b, 330c, 330d for one user. The actual receiving beam for a first subframe based on potential receiving beam 320 is shown by beam 321. The possible beam direction for a second subframe is shown by beam 323. If a finer beam is directed to a user accurately, a larger beamforming antenna gain can be achieved. The beamforming antenna gain is smaller with an unoptimized beam, which may be used in the following scenarios:

Case 1: Transmit with not the best beam to meet latency requirement
Case 2: Transmit with limitation by channel state information (CSI) measurement for multiple beams
Case 3: Transmit with limitation by transmission for common channel.

Since beam switching may be made subframe by subframe, a dynamic power control scheme may be required to follow the change in beamforming gain. In an LTE system, dynamic power control is realized in the close loop part. The adjusted value for every adjustment time is shown in Table 1. That is, maximum 3 dB for accumulated mode and maximum 4 dB for absolute mode for every adjustment. It may be difficult to keep up with dynamic change of receive beamforming gain caused by beam switching in m-MIMO system, especially when hybrid beamforming scheme is used. Therefore, it may be desirable to provide an enhanced uplink power control scheme to follow the change of beamforming gain for m-MIMO system.

TABLE 1A

Mapping of TPC Command Field in DCI format 0/3/4 to absolute and accumulated $\delta_{PUSCH, c}$ values

| TPC Command Field in DCI format 0/3/4 | Accumulated $\delta_{PUSCH, c}$ [dB] | Absolute $\delta_{PUSCH, c}$ only DCI format 0/4 |
|---|---|---|
| 0 | −1 | −4 |
| 1 | 0 | −1 |

TABLE 1A-continued

Mapping of TPC Command Field in DCI format 0/3/4 to absolute and accumulated $\delta_{PUSCH, c}$ values

| TPC Command Field in DCI format 0/3/4 | Accumulated $\delta_{PUSCH, c}$ [dB] | Absolute $\delta_{PUSCH, c}$ only DCI format 0/4 |
|---|---|---|
| 2 | 1 | 1 |
| 3 | 3 | 4 |

TABLE 1B

Mapping of TPC Command Field in DCI format 3A to accumulated $\delta_{PUSCH, c}$ values

| TPC Command Field in DCI format 3A | Accumulated $\delta_{PUSCH, c}$ [dB] |
|---|---|
| 0 | −1 |
| 1 | 1 |

One option may be the extension of the dynamic adjustment range for each adjustment time. This may lead to high dynamic signalling overhead. For example, when 9 dB is used as the design requirement for the dynamic change of receive beamforming gain, the power adjustment set {−1 0 1 3} changes to {−10 −9 −8 −7 −6 −5 −4 −3 −2 −1 0 1 2 3 4 5 6 7 8 9 10 11 12}. Dynamic signalling overhead will increase from 2 bits to 5 bits. This overhead may be too large for (e)PDCCH. An enhanced power control scheme is sought, which achieves good tradeoff between dynamic adjustment ability and signalling overhead.

Figure 4:
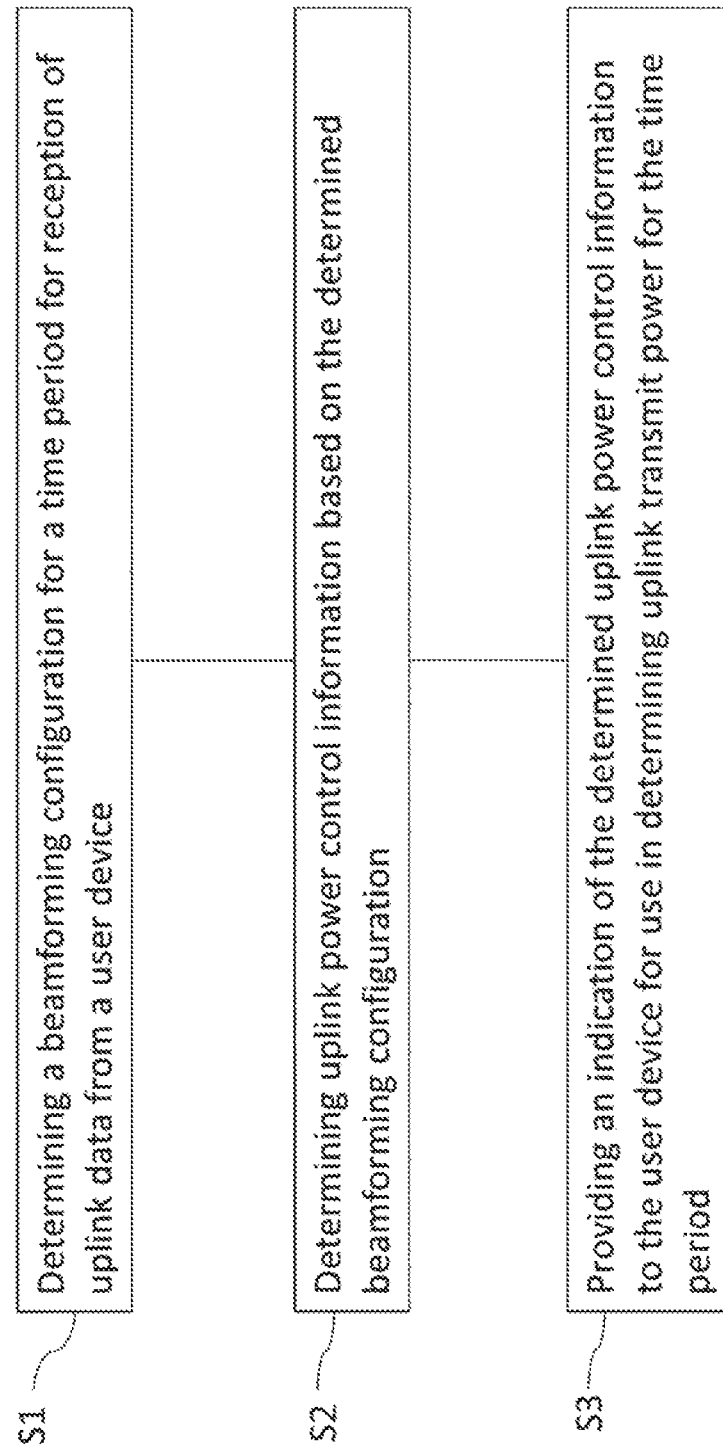
FIG. 4 shows a flowchart of an example method according to an embodiment

FIG. 4 shows a flowchart of an example method which may provide a more accurate uplink power control scheme with reasonable signalling overhead which is applicable to beam switching for m-MIMO system. In a first step, S1, the method comprises determining a beamforming configuration for a time period for reception of uplink data a user device.

In a second step, S2, the method comprises determining uplink power control information based on the determined beamforming configuration.

In a third step, S3, the method comprises providing an indication of the determined uplink power control information to the user device for use in determining uplink transmit power for the time period.

In an embodiment, the time period is subframe or a plurality of subframes. In an embodiment, the time period is a transmission time interval (TTI)

The beamforming configuration may be the reception beamforming configuration of the eNB, such as the beam direction/orientation of at least one reception beam of the eNB.

Alternatively, or in addition, the beamforming configuration may be the transmit beamforming configuration of the UE, such as the beam direction/orientation of at least one transmit beam of the UE.

As an example, when the beamforming configuration defines/provides a narrow and directed beam to the UE and/or to the eNB, then there may be reason to decrease the transmit power. On the other hand, when the beam is omni-directional, or at least not as directed and narrow as in the first example, then there may be need to increase the UE's transmit power. The need to increase or to decrease the UE's transmit power based on certain kind of beamforming configuration may be predetermined via empirical or mathematical modelling, for example.

A method as described with reference to FIG. 4 may be performed at a network node, such as an eNB. One or a plurality of sets of power control parameters may be configured at the UE.

The power control parameters may be used by the UE to define the uplink transmit power it is supposed to use at a certain time period, such as during one or more subframes or transmission time intervals, etc. The power control parameters may comprise for example one or more of the following: P0, and α.

The uplink power control information may be determined based on a beamforming gain associated with the determined beamforming configuration. The uplink power control information may be determined based on a comparison between the beamforming gain associated with the determined beamforming configuration and a reference beamforming gain associated with a reference beam forming configuration. The reference uplink transmit power and the associated reference beamforming configuration may be stored at the UE. The reference uplink transmit power may be defined a by an associated set of power control parameters.

The indication of the determined uplink power control information may be referred to as power control related signalling. The uplink power control information may comprise any information suitable for use by a UE in determining the uplink transmit power to apply for a time period (e.g. one or more subframes), such as uplink power control commands.

For example, in some embodiments, the indication may comprise an indication of an uplink transmit power value to be applied during the time period. The uplink transmit power value is associated with the determined beamforming configuration. The uplink transmit power based on the determined beamforming configuration may be referred to as the baseline uplink transmit power value. The baseline may refer here to the open loop part of the power control, and the baseline UL Tx power may still be subject to closed loop power control with conventional transmit power control (TPC).

The indication may be carried in an additional signalling. The indication may provide for adjusting uplink transmit power to follow a burst change of beamforming gain caused by beam switching.

When one set of power control is used, additional dynamic signalling may be used for adjustment of a reference uplink transmit power to adapt according to the change of the beamforming gain of the reception beamforming configuration of the eNB. The reference uplink transmit power is associated with a reference beamforming configuration. The reference uplink transmit power and the associated reference beamforming configuration may be stored at the UE.

The additional signalling may be carried along with conventional TPC commands to the UE. The additional signalling may be a one bit indication to reduce/increase the UL Tx power with respect to the reference transmit power. This may apply for example in cases where there is only one reference Tx power available, i.e. only one set of power control parameters available. The UE knows the reference Tx power and the indication of the uplink power control information may define an offset relative to the reference uplink transmit power value. In an embodiment, the power uplink control information comprises an indication of an uplink transmit power value to be applied during the time period. The uplink transmit power value may be an offset relative to a reference uplink transmit power value. That is, for a UE configured with one set of power control parameters, there may be only one reference UL Tx power in use, and the additional signalling (i.e. the indication of the uplink power control information) carries an indication to change the Tx power from the reference uplink Tx power, either as an absolute value or as an offset.

In another embodiment, there may be a plurality of baseline or reference uplink transmit powers, each associated with a respective one of a plurality of beamforming configurations. Associations between a respective baseline uplink transmit power and beamforming configuration may be stored in the UE. In this embodiment, the additional signalling may be a single bit to indicate a certain index of baseline transmit power. The baseline transmit power may be defined by a set of power control parameters (or power control set), including P0 and α, for example. The single bit indication may indicate an index for a respective one of the stored plurality of sets of power control parameters. That is, the uplink power control information comprises an indication of a set of power control parameters from a plurality of sets of power control parameters.

As an example, when the determined beamforming configuration provides a narrow and directed beam to the UE and/or to the eNB, then there may be reason to select a power control set having a reduced UE transmit power. On the other hand, when the determined beamforming configuration defines a wider beam, then there may be need to select a power control set which increase the UE's transmit power compared to previous or otherwise to-be-applied transmit power.

It may be worth noting that in some cases the uplink power control information need not be sent. These cases may comprise cases where the determined beamforming configuration provides a beam or beams which are in-line with the current or otherwise to-be-applied transmit power of the UE. Thus, the use of the additional signalling carrying the uplink power control information in the TPC commands may be avoided in some cases which reduces the signalling overhead.

In an embodiment, the transmit beamforming configuration of the UE affects the beamforming gain and thus the uplink transmit power to be applied. The eNB may then determine a suitable beamforming configuration for the UE, possibly in addition to the reception beamforming configuration of the eNB, and then the eNB may derive the uplink power control information for the UE.

In an embodiment, for one power control set with accumulated power control mode, a closed loop power control adjustment value indicated by common signalling may be derived with respect to the reference beamforming gain, and thus with respect to the reference uplink transmit power.

When multiple sets of power control are used, each power control set (which provides a baseline UL Tx power) is linked with one specific beam or beamforming gain. In such cases, the additional signalling (i.e. the indication of the uplink power control information) carries e.g. the index of the selected set. Thus, the change of burst beamforming gain is eliminated in one power control set. Then, independent power control is made for each set. The independent power control may, for example, be the closed loop power control for fine tuning the baseline transmit power associated with the beamforming configuration, for example.

In some embodiments, dynamic beam switching is supported. Then additional dynamic signalling may be used to indicate the power control set index. The indication may be made for any given subframe. The indication may indicate a different a different power control set index for different UEs.

In some embodiments, a semi-static pattern is used for beam switching. Additional semi-static signalling, e.g. RRC signalling, may be used to indicate the subframe index for each power control set. One set of power control parameters may be valid for all of the subframes of that set of subframes. Consequently, the power control set index can be implicitly determined by subframe index. In other words, when the UE knows the current subframe index, the UE may derive the power control set (i.e. set of power control parameters) for this given subframe set.

In the case of one set of power control, only one set of parameters, e.g. P0, a defining the reference/baseline transmit power is assumed. One reference beamforming and associated beamforming gain are assumed for determining this power control parameter, set by eNB. The reference beamforming and the associated reference beam forming gain may both be predetermined and stored at the eNB and UE. One pathloss measurement linked with reference beamforming is maintained at UE's side. The eNB may make accumulated or absolute power control based on this power control parameter set. On account of burst change of receive beamforming gain by beam switching, an additional dynamic signalling adjusts the baseline/reference transmit power, i.e., $P_{O\_PUSCH,c}(j)+\alpha_c(j) \cdot PL_c$. In detail, an additional signalling may be used for increasing baseline transmit power to reflect the change of beamforming gain relative to reference beamforming gain. As said above, based on the adjusted baseline transmit power, eNB may further make finer close loop power control with TPC signalling.

Figure 5:
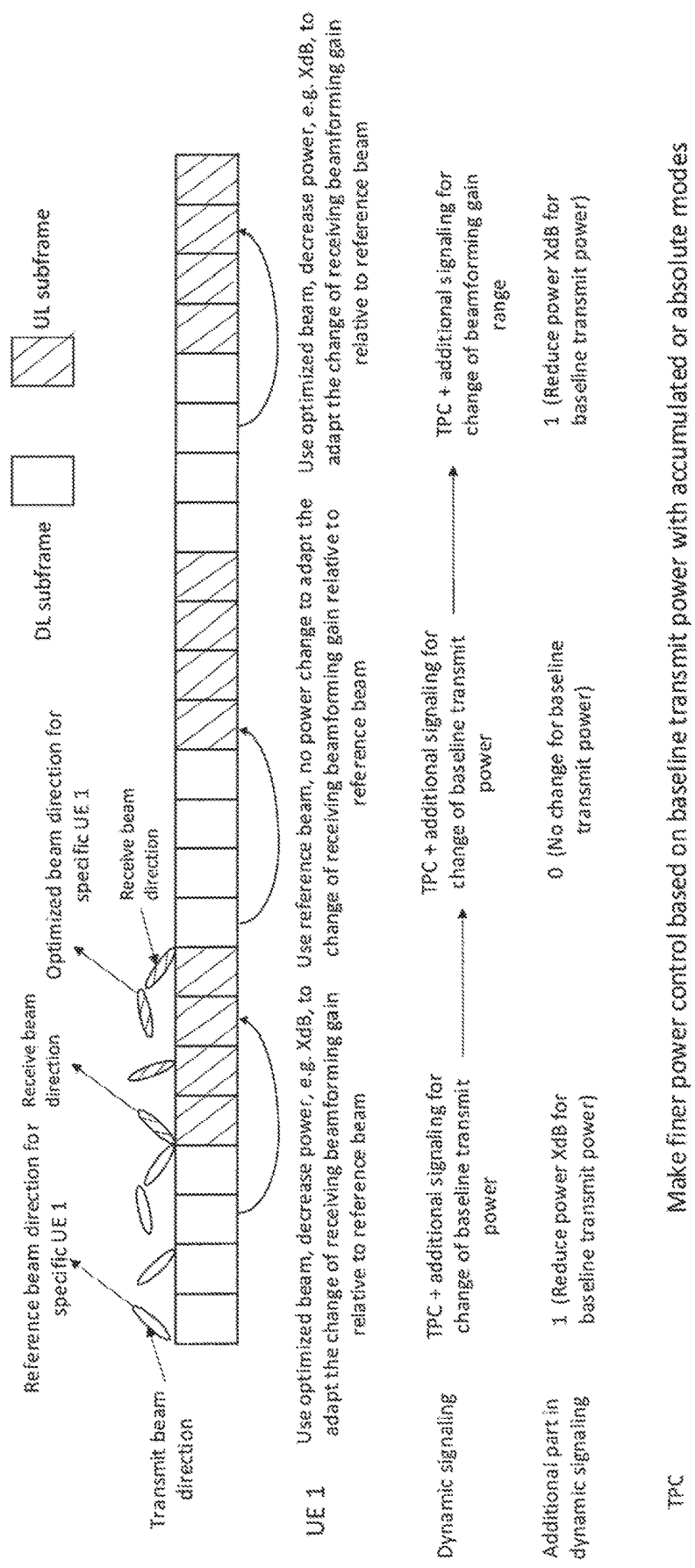
FIG. 5 shows a schematic illustration of dynamic signalling for baseline transmit power adjustment according to an embodiment.

One example is illustrated in FIG. 5. With the proposed uplink power control information signalling, the burst change of link quality caused by beam switching is eliminated. Thus, the power adjustment range needed for the closed loop power control in one subframe can be reduced. The transmit power control can react to the change of uplink transmission link quality in time.

For accumulated power control mode, the TPC signalling can be transmitted by DCI format 3/3A. Its content may include conventional accumulated transmit power control bit(s). The accumulated transmit power control part, may provide power control with reasonable signalling overhead.

Figure 6:
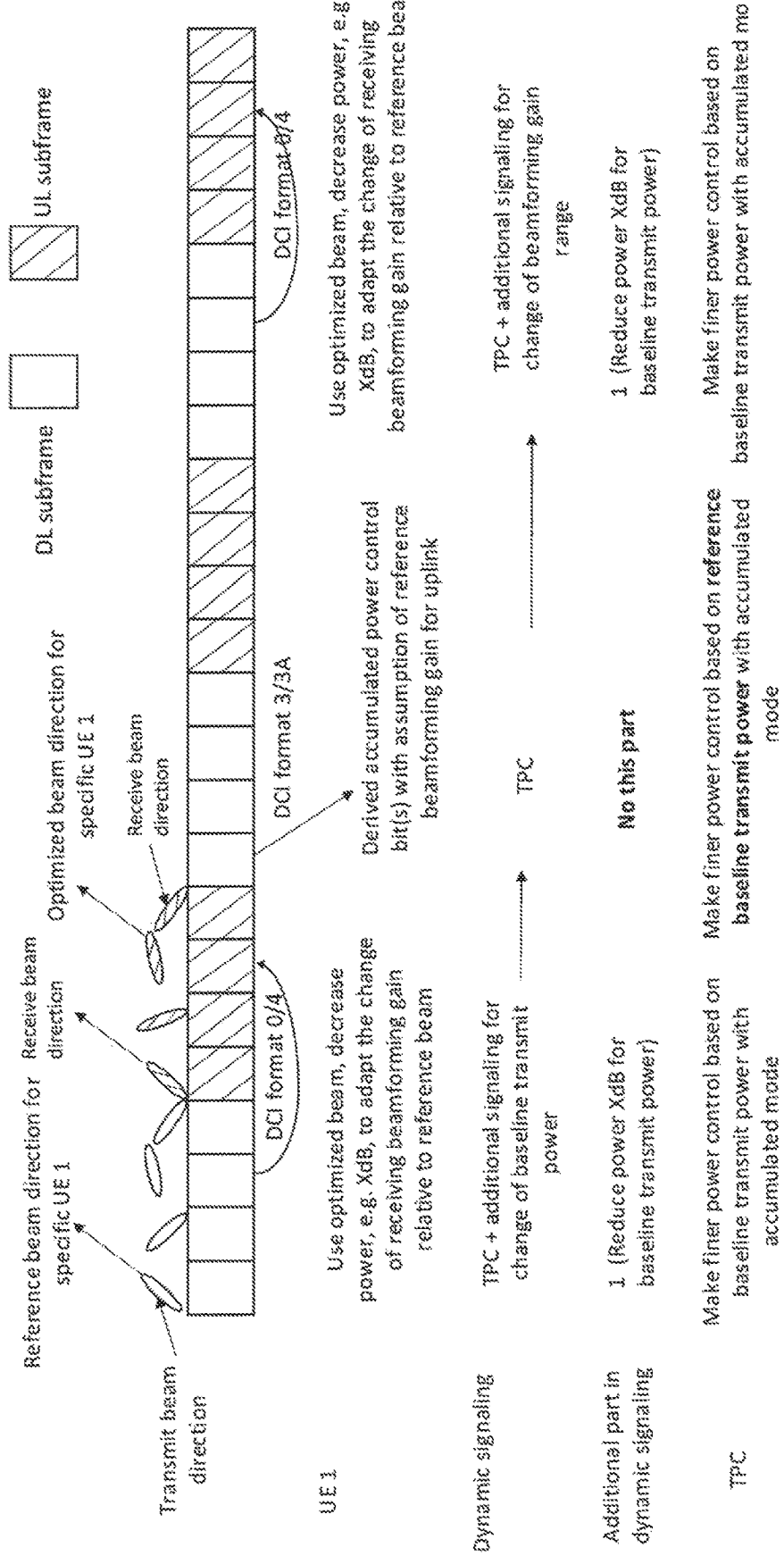
FIG. 6 shows a schematic illustration of dynamic signalling for accumulated power control.

When the eNB derives the TPC signalling for accumulated power control part, the TPC signalling is based on assuming that the reference beamforming gain (associated with the reference beamforming configuration) is applied. This may be the case when there is no uplink data transmission expected or linked with this TPC signalling. This may also be the case when the uplink data transmission expected from the UE or directly linked with this TPC signalling is restricted only to the reference beam associated with the reference beamforming configuration. An example for accumulated power control is shown in FIG. 6. In an embodiment, there may not be need for additional signalling of the TPC carrying the uplink power control information for adjusting the baseline transmit power in case of downlink control information (DCI) format 3/3A. Only the TPC signalling carrying the closed loop power control command, e.g. accumulated signalling, is needed for DCI format 3/3A.

The DCI 3/3A is control signalling and it can, in an embodiment, be used only for the accumulated power control mode. For DCI 3/3A this may be common power control signalling, which means that the TPC signalling typically includes power control indication for many UEs. So the overhead plays an important part because many UEs (or UE groups) are in question. Therefore, it may be beneficial not to send the determined uplink transmit power information to all UEs. This may reduce the TPC signalling overhead and it possible because the actual data uplink transmission from the UEs to the eNBs is not made in many cases at all. So there is no need to send the uplink transmit power information to serve only marginal or no UEs. The receiving the TCP in DCI 3/3A makes the indicated closed loop power adjustment, even if they do not have actual data transmission to the eNB. In another embodiment, the UE receiving the TCP in DCI 3/3A may make a data transmission but the UE may be restricted to make the data transmission with the reference beam. In other words, if there is no actual data transmission, any power adjustment (otherwise indicated with the uplink transmit power information) due to beam switching is not needed. And, if the restriction of the latter embodiment is applied, then a reference beam of the reference beamforming configuration is used for data transmission). So even in this case, there is no need for the power adjustment due to beam switching.

However, if the signalling overhead is not considered, the additional signalling for adjusting baseline transmit power may be included in the TPC signalling in case of DCI format 3/3A.

Figure 7:
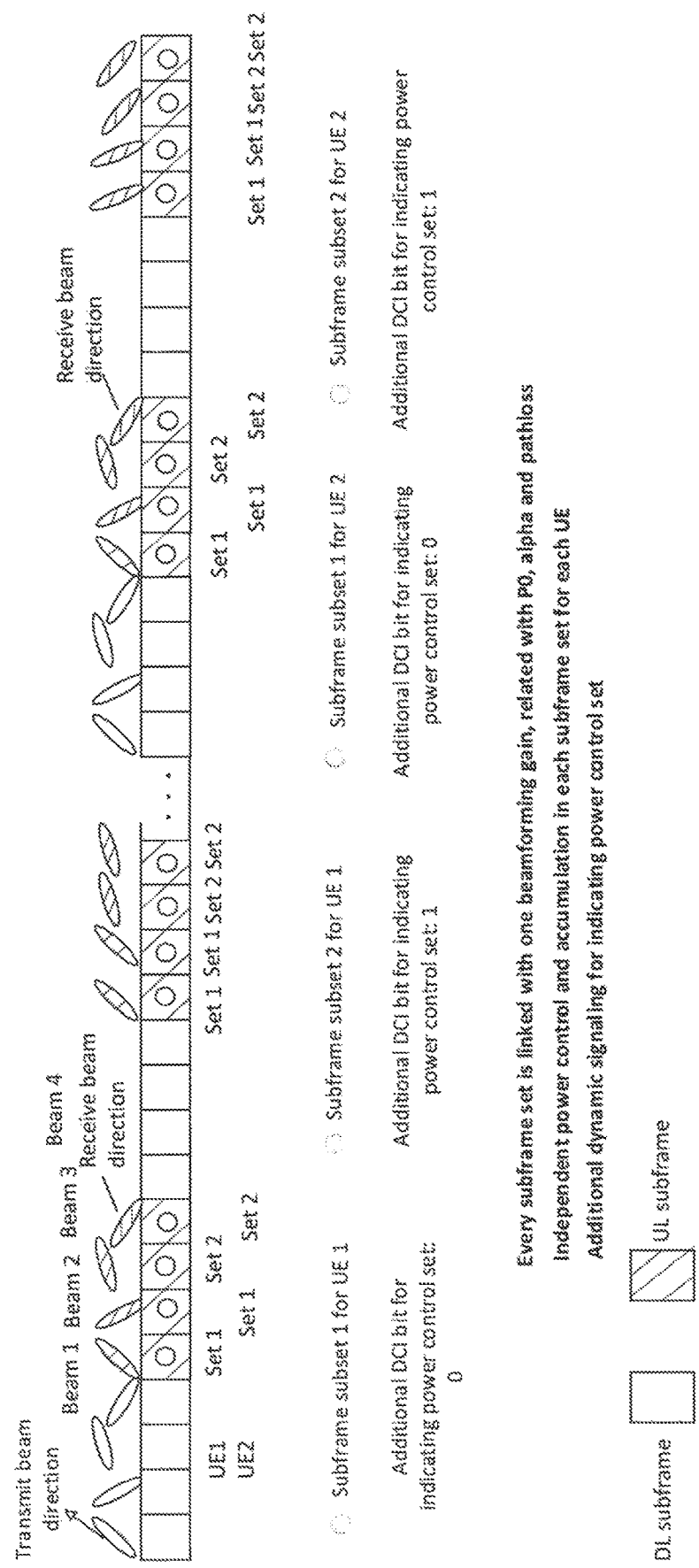
FIG. 7 shows a schematic illustration of signalling for power control with multiple sets for flexible beam switching.

In the case multiple set of power control, multiple set of power control parameters, e.g. P0, α, and consequently multiple baseline/reference uplink transmit powers associated with multiple reference beamforming configurations, are assumed. One specific beamforming configuration and associated beamforming gain are assumed when determining one power control parameter set by the eNB. Furthermore, measurements for multiple pathloss may be maintained at UE's side. The UE may measure these by measuring a signal strength of the downlink signal, such as a downlink reference signal. One measured pathloss is implicitly linked with one power control set based on the used beam (e.g. based on the used beamforming configuration). Multiple beamformed CSI-RS can be used for the RSRP measurement for different beams. Based on a pathloss computation formula, the beamforming gain can be reflected in pathloss by RSRP measurement results. The eNB may then make independent accumulated or absolute power control for each set based on their power control parameter set and linked pathloss. Since each set is linked with a specific beamforming gain, burst change of receive beamforming gain is eliminated in each set. Dynamic signalling (e.g. the indication of the determined uplink power control information) is used to indicate the power control set index to the UE. The UE may then derive the baseline uplink transmit power corresponding to the indicated power control set. In FIG. 7, an example is given for enhanced power control scheme with multiple sets. Since the dynamic signalling for power control set is increased in addition to TPC, it can make accurate power adjustment in case of flexible beam switching.

Figure 8:
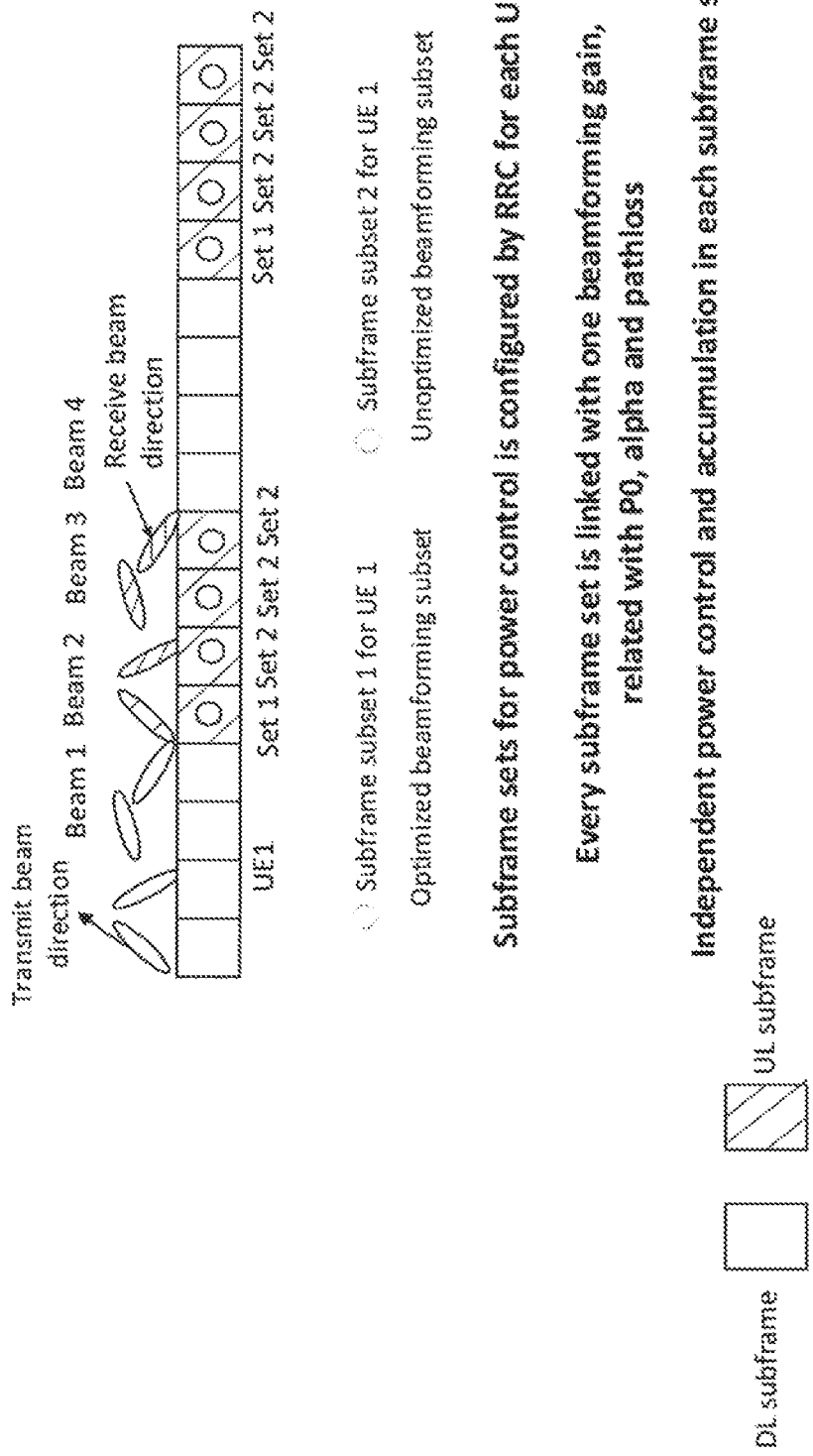
FIG. 8 shows a schematic illustration of signalling for power control with multiple sets for fixed transmit/receive beamforming.

When the transmit/receive beamforming pattern is semi-statically changed, semi-static signalling, e.g. RRC signalling, may be used to indicate subframe pattern for each power control set. In each subframe set or subset, independent accumulated or absolute power control mechanism may be used. In FIG. 8, an example is given, in which each of two power sets are associated with a respective set of one or more subframes with different level of beamforming gain. TPC power control may be made in each of the sets independently.

Let us know take a look at some functions of the eNB.

In an embodiment, the eNB transmits CRS or CSI-RS for UE's RSRP measurement and then determines at least one power control parameter set for open loop part of power control. The parameter set may comprise e.g. e.g. P0, α.

The eNB may determine P0 so as to guarantee a desired receive power at eNB's side. The signalling for P0 includes both a cell specific parameter $P_{O\_NOMINAL\_PUSCH,c}(j)$ and a UE specific parameter $P_{O\_UE\_PUSCH,c}(j)$. The eNB determines α to achieve good tradeoff between cell average and cell edge uplink throughput.

The eNB determines $\Delta_{TF,c}(i)$, $f_c(i)$ and additional signalling for close loop part of power control. When one power control set is configured, the uplink power control information may comprise an offset relative to the baseline transmit power value.

The eNB may determine baseline transmit power adjustment value (e.g. offset) according to actual receive beam of the eNB and/or the actual transmit beam of the UE. A possible power adjustment set is indicated by high layer signalling, for example, {0, X} dB. The indication of the determined uplink power control information may comprise a dynamic indication of the selected adjustment value for baseline transmit power, or an index of the selected baseline transmit power, for example.

When common control signalling, e.g. DCI format 3/3A is used for TPC with accumulated mode, eNB may only use the transmit power control (TPC) signalling to adjust the transmit power, without sending any indication for change of the baseline transmit power. The eNB determines the TPC value with the assumption that reference beam is used for receive beam.

When a plurality of power control sets are configured, eNB may determine power control parameter set from the plurality of power control sets according to actual receive beam of the eNB and/or the actual transmit beam of the UE.

Dynamic signalling may be used to indicate UE the selected power control set if flexible beamforming is used.

The method may comprise providing an indication of at least one subset associated with a respective one of the plurality of sets of power control parameters, such that the user device is able to determine the set of power control parameters for at least one subset based on a subframe index associated with the at least one subframe. That is, semi-static signalling, e.g. RRC signalling, may be used to indicate to the user device a subframe subset for each power control set, if semi-static pattern is used for beam switching.

The eNB independently determines $\Delta_{TF,c,k}(i)$, $\delta_{c,k}(i)$ for each power control set of the plurality of power control sets. The eNB notifies UE the corresponding determined contents by TPC signalling.

Let us then look at some functions of the UE.

In an embodiment, the UE makes signal strength measurement(s) and sets up transmit power according to the received indication, including dynamic and semi-static signalling if included.

In an embodiment, a UE makes RSRP measurement on reference signal received from an eNB. For one power control set, CRS or CSI-RS can be used for measurement. For multiple power control sets, multiple CSI-RS with different beamforming configurations can be used for measurement.

UE determines pathloss by
$PL_c$=referenceSignalPower−higher layer filtered RSRP, where referenceSignalPower is obtained by RRC signalling; higher layer filtered RSRP is obtained by UE's measurement.

The UE may then set transmit power according to power control signalling from eNB.

For one power control set, the following formula can be used for setting power:

$$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j)\cdot PL_c + \gamma_c(i) + \Delta_{TF,c}(i) + f_c(i) \end{cases}$$

Where $M_{PUSCH,c}(i)$ is scheduled PRB number; $P_{O\_PUSCH,c}(j)$, $\alpha_c(j)$ is indicated by RRC signalling, $PL_c$ is obtained by UE measurement; $\Delta_{TF,c}(i)$ is derived by MCS; $f_c(i)$ is derived by TPC; $\gamma_c(i)$ is derived by additional dynamic signalling for adjusting baseline transmit power;
  i. When common control signalling, e.g. DCI format 3/3A, is received, it may be used for updating $f_c(i)$ For multiple power control sets, the following formula can be used for setting power:

$$P_{PUSCH,c,k}(i) = \min\begin{cases} P_{CMAX,c}(i), \\ 10\log_{10}(M_{PUSCH,c}(i)) + P_{O\_PUSCH,c,k}(j) + \alpha_{c,k}(j)\cdot PL_{c,k} + \Delta_{TF,c,k}(i) + f_{c,k}(i) \end{cases}$$

ii. UE firstly obtains power control set index k
  A. When dynamic beam switching is supported, power control set index may be indicated by dynamic signalling;
  B. When semi-static pattern is used for beam switching, power control set index is implicitly determined by subframe index. The subframe index for each power control set may be indicated by RRC signalling.
iii. UE gets the $P_{O\_PUSCH,c,k}(j)$, $\alpha_{c,k}(j)$ by RRC signalling and $PL_{c,k}$ by measurement for parameter set k linked with receive beam
iv. UE derives the $\Delta_{TF,c,k}(i)$ by MCS and $f_{c,k}(i)$ by TPC for parameter set k linked with receive beam.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a standalone LTE networks, similar principles may be applied in relation to other examples of 3G, LTE or 5G networks. It should be noted that other embodiments may be based on other cellular technology other than LTE or on variants of LTE. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

Figure 9:
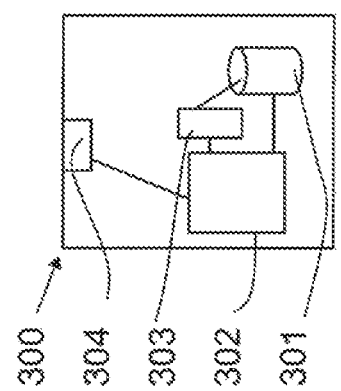
FIG. 9 shows a schematic diagram of an example control apparatus.

The method may be implemented in entities on a mobile device as described with respect to FIG. 2 or control apparatus as shown in FIG. 9. The method may be implanted in a single processor 201 or control apparatus or across more than one processor or control apparatus. FIG. 9 shows an example of a control apparatus for a communication system, for example to be coupled to and/or for controlling a station of an access system, such as a RAN node, e.g. a base station, (e) node B, a central unit of a cloud architecture or a node of a core network such as an MME or S-GW, a scheduling entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions. Control functions may comprise determining a beamforming configuration for a time period for reception of uplink data from a user device, determining uplink power control information based on the determined beamforming configuration and providing an indication of the determined uplink power control information to the user device for use in determining uplink transmit power for the time period.

Alternatively, or in addition, control functions may comprise receiving an indication of determined uplink power control information from a network node, wherein said uplink power control information is determined based on a determined beamforming configuration for a time period intended for transmission of uplink data from a user device and using said indication to determine uplink transmit power for the time period.

In an embodiment at least some of the functionalities of the apparatus of FIG. 9 may be shared between two physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual net-working may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides net-work-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
   determining, by a network node, a plurality of beamforming configurations to be used for measurements related to pathloss;
   determining, by the network node, a plurality of sets of uplink power control parameters based on the determined plurality of beamforming configurations; and
   providing, by the network node, downlink control information including an indication indicative of a set of uplink power control parameters from the plurality of sets of uplink power control parameters to a user device;
   wherein the set of uplink power control parameters is linked with one of the plurality of beamforming configurations; and
   wherein each of the plurality of sets of uplink power control parameters comprises at least a P0 and an alpha parameters.

2. The method according to claim 1, comprising:
   determining, by the network node, the set of uplink power control parameters based on a beamforming gain associated with the one of the plurality of beamforming configurations.

3. The method according to claim 2, comprising:
   determining the set of uplink power control parameters based on a comparison between the beamforming gain associated with the one of the plurality of beamforming configurations and a reference beamforming gain associated with a reference beamforming configuration.

4. The method according to claim 1, comprising:
   transmitting an indication of a set of time periods associated with a respective one of the plurality of sets of uplink power control parameters.

5. The method of claim 1, comprising:
   providing an indication of closed loop uplink transmit power control information to further adjust an uplink transmit power value determined based on the set of uplink power control parameters.

6. The method according to claim 5, wherein the closed loop uplink transmit power control information is based on a common accumulated power control mode for a plurality of user devices, and the method further comprises:
   determining the closed loop uplink transmit power control information based on a reference beamforming gain associated with a reference beamforming configuration.

7. The method according to claim 1, wherein the plurality of beamforming configurations define at least one receive beam and at least one transmit beam.

8. The method according to claim 1, wherein the time period is a subframe.

9. A method comprising:
   receiving, by a user device, downlink control information including an indication indicative of a set of uplink power control parameters from a plurality of sets of uplink power control parameters to be used by the user device in controlling uplink transmit power, wherein the indicated set of uplink power control parameters is linked with a beamforming configuration used for a measurement related to a pathloss;
   determining the pathloss based on the beamforming configuration; and
   transmitting uplink data by using uplink transmit power determined based on the indicated set of uplink power control parameters and the pathloss;
   wherein each of the plurality of sets of uplink power control parameters comprises at least a P0 and an alpha parameters.

10. The method according to claim 9, comprising:
    performing a downlink signal strength measurement with respect to the beamforming configuration, wherein the pathloss is determined based on a reference signal power and the downlink signal strength measurement; and
    determining the uplink transmit power based on the indicated set of uplink power control parameters and the determined pathloss.

11. The method according to claim 9, comprising:
    performing a downlink signal strength measurement with respect to each of a plurality of beamforming configurations, wherein each of the plurality of the beamforming configurations is associated with a respective one of the plurality of sets of uplink power control parameters.

12. A computer program product, the computer program product being tangibly embodied on a non-transitory computer-readable storage medium and including instructions that, when executed by at least one processor, are configured to perform the method of claim 9.

13. An apparatus comprising:
    at least one processor and at least one memory including a computer program code, the at least one memory and the computer program code configured to, with the at least one processor, cause the apparatus at least to:
    receive downlink control information including an indication indicative of a set of uplink power control parameters from a plurality of sets of uplink power control parameters to be used by the apparatus in controlling uplink transmit power, wherein the indicated set of uplink power control parameters is linked with a beamforming configuration used for a measurement related to a pathloss;
determine the pathloss based on the beamforming configuration; and
transmit uplink data by using uplink transmit power determined based on the indicated set of uplink power control parameters and the pathloss;
wherein each of the plurality of sets of uplink power control parameters comprises at least a P0 and an alpha parameters.

14. The apparatus according to claim 13, wherein the apparatus further configured to:
perform a downlink signal strength measurement with respect to a reference beamforming configuration, wherein the pathloss is calculated based on a reference signal power and the downlink signal strength measurement; and
determining the uplink transmit power based on the indicated set of uplink power control parameters and the determined pathloss.

15. The apparatus according to claim 13, wherein each beamforming configuration, of a plurality of beamforming configurations, is linked with a respective set of the plurality of sets of uplink power control parameters.

16. The apparatus according to claim 13:
wherein each beamforming configuration, of a plurality of beamforming configurations, is associated with a beam direction or orientation and/or a beam width; and
wherein each beamforming configuration is linked with a respective set of the plurality of sets of uplink power control parameters.

17. The apparatus according to claim 15, wherein the plurality of beamforming configurations define at least one receive beam and at least one transmit beam.

18. The apparatus according to claim 13, wherein the indication indicative of the set of uplink power control parameters includes a bit indicating an index of a baseline transmit power defined by the set of uplink power control parameters.

* * * * *